(12) United States Patent
Kassai et al.

(10) Patent No.: US 7,065,893 B2
(45) Date of Patent: Jun. 27, 2006

(54) MEASUREMENT PROBE AND USING METHOD FOR THE SAME

(75) Inventors: Takaaki Kassai, Suita (JP); Keishi Kubo, Moriguchi (JP); Masateru Doi, Hirakata (JP); Hiroyuki Mochizuki, Katano (JP); Keiichi Yoshizumi, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 3 days.

(21) Appl. No.: 11/014,947

(22) Filed: Dec. 20, 2004

(65) Prior Publication Data

US 2005/0204573 A1    Sep. 22, 2005

(30) Foreign Application Priority Data

Dec. 24, 2003   (JP)  ............................. 2003-426025

(51) Int. Cl.
   *G01B 5/00*   (2006.01)
(52) U.S. Cl. .......................................... 33/554; 33/561
(58) Field of Classification Search ................. 33/549, 33/551, 553, 554, 555, 556, 558, 559, 561, 33/DIG. 1, DIG. 2
   See application file for complete search history.

(56) References Cited

U.S. PATENT DOCUMENTS

| | | | |
|---|---|---|---|
| 4,703,261 A | * | 10/1987 | Berchtold ..................... 33/558 |
| 4,941,266 A | * | 7/1990 | Bissegger et al. ............ 33/556 |
| 5,041,806 A | * | 8/1991 | Enderle et al. ............... 33/561 |
| 5,174,039 A | | 12/1992 | Murai |
| 5,455,677 A | | 10/1995 | Yoshizumi et al. |
| 6,480,286 B1 | | 11/2002 | Kubo et al. |
| 6,874,243 B1 | * | 4/2005 | Hama et al. .................. 33/551 |
| 2005/0283990 A1 | * | 12/2005 | McMurtry et al. ............ 33/556 |

FOREIGN PATENT DOCUMENTS

| | | |
|---|---|---|
| JP | 4-98114 | 3/1992 |
| JP | 6-265340 | 9/1994 |
| JP | 2000-283747 | 10/2000 |

* cited by examiner

*Primary Examiner*—Christopher W. Fulton
(74) *Attorney, Agent, or Firm*—Wenderoth, Lind & Ponack, L.L.P.

(57) ABSTRACT

A measuring probe for obtaining positional information on a measuring target face has: a movable member having a contact portion which is formed in its top and comes into contact with the measuring target face and a reflecting plane formed on its base end for reflecting a measuring light beam; a magnetic substance mounted on the movable member; a fixed member disposed in a fixed state; a bearing provided on the fixed member for supporting the movable member movably in axis line direction; and a magnetic force generating portion provided on the fixed member for generating force acting upon the magnetic substance to move the movable member in the axis line direction. The movable member is formed from a nonmagnetic material, and the bearing and the fixed member are formed from a magnetic material.

11 Claims, 9 Drawing Sheets

MEASUREMENT PROBE AND USING METHOD FOR THE SAME

TECHNICAL FIELD

The present invention relates to an optical measuring probe for obtaining positional information on a measuring target face, and to a method for using the measuring probe.

BACKGROUND OF THE INVENTION

An optical measuring apparatus irradiates a measuring target face with a measuring light beam and receives the measuring light beam reflected by the measuring target face so as to obtain information about displacement and shape of the measuring target face contained in the reflected measuring light beam. However, direct irradiation of the measuring target face with the measuring light beam makes high-accuracy measurement difficult due to reflection characteristics and influence of inclination of the measuring target face. Accordingly, various measuring probes having a function to move in conformity to the measuring target face and a function to reflect the measuring light beam have conventionally been proposed.

For example, in Japanese publication of unexamined patent application No. 2000-283747, a measuring probe having two parallel plate springs has been disclosed. Base ends of the plate springs are fixed to a mainframe of an optical measuring apparatus while top ends thereof are equipped with a contact portion which comes into contact with a measuring target face. A reflecting plane for reflecting a measuring light beam is provided on a back face of the contact portion. The contact portion is resiliently pressed to the measuring target face by the plate springs so as to displace in compliance with projections and depressions of the measuring target face and deformation thereof.

Moreover, in Japanese publication of unexamined patent application No. H06-265340, there has been disclosed a measuring probe having an air slide portion movable in vertical direction, in which a contact portion is mounted on a lower end of the air slide portion and an upper end thereof serves as a reflecting plane. Such an air slide portion is supported by a spring.

Moreover, in Japanese publication of unexamined patent application No. H04-98114, a measuring probe shown in FIG. 11 has been disclosed. The measuring probe is composed of: a cylindrical housing 101; an air bearing 102 provided inside the housing 101; a probe shaft 103 supported by the air bearing 102 movably in an axial direction thereof; a stylus 104 which comes into contact with a measuring target face at a front end of the probe shaft 103; a stopper 105 for regulating movement of the probe shaft 103 in the axial direction; a length measuring portion 106 having a corner cube 106a provided on a rear end portion of the probe shaft 103 for detecting a moving amount of the probe shaft 103; a contact pressure regulating portion 107 provided on the rear end portion of the probe shaft 103 and the inside of the housing 101; a contact pressure detecting portion 108 provided in between the probe shaft 103 and the stopper 105 for detecting a contact pressure of the stylus 104 upon the measuring target object; and a contact pressure control portion 109 for optimizing the contact pressure for the contact pressure regulating portion 107 based on a detection result of the output voltage 108.

The housing 101 has: a first housing portion 110 encircling the corner cube 106a; a second housing portion 111 connected to the first housing portion 110 for retaining the contact pressure regulating portion 107; a third housing portion 112 connected to the second housing portion 111 for retaining the air bearing 102; a fourth housing portion 113 connected to the third housing portion 112 for concentrically encircling the contact pressure detecting portion 108; and a fifth housing portion 114 which is connected to the fourth housing portion 113 and has the stopper 105 concentrically inserted thereinto. It is to be noted that in the contact pressure regulating portion 107, a core 115 is provided on the probe shaft 103 and permanent magnets 116, 117, coils 118, 119, collar-shaped fins 120 for releasing heat of the coils 118, 119 and the like are provided on the side of the second housing portion 111.

However, these conventional measuring probes have following problems.

In the invention disclosed in the Japanese publication of unexamined patent application No. 2000-283747, while it is essential for accurate measurement that the reflecting plane of the contact portion is perpendicular to the measuring light beam, the projections and depressions of the measuring target object cause subtle changes in an angle of the reflecting plane of the measuring probe and therefore it becomes difficult to constantly irradiate the reflecting plane with a perpendicular measuring light beam. Moreover, when the measuring probe is replaced, it is difficult to set the reflecting plane to be perpendicular to the measuring light beam.

Moreover, in the invention disclosed in the Japanese publication of unexamined patent application No. H06-265340, the air slide and the spring to support the weight of the air slide are used and therefore the measuring probe cannot be disposed in horizontal direction.

Moreover, in the inventions disclosed in the Japanese publication of unexamined patent application No. 2000-283747 and the Japanese publication of unexamined patent application No. H06-265340, both the measuring probes do not have mechanisms to move the contact portions by very small distances with respect to the measuring target faces. Therefore, at the start of measurement, it is necessary to force the contact portions to run upon edge of the measuring target objects so as to dispose the contact portions on the measuring target faces. Consequently, damages on the measuring target face or force acting in direction perpendicular to the measuring direction may cause failures of the springs or the contact portions of the measuring probes.

Moreover, in the case of the measuring probe disclosed in the Japanese publication of unexamined patent application No. H04-98114, it is unclear if magnetic force generated by application of current to the coil operates in the state of being focused on a magnetic substance since materials of the contact pressure regulating portion 107 and members constituting its periphery are not identified. Further, as described above, the housing 101 serving as a fixed member is assembled by connecting five members in sequence, which requires screws necessary for the assembling and female screws corresponding to the screws, thereby making downsizing difficult and increasing external dimensions of the housing. This upsizes the measuring probe and increases heat capacity of the probe. Consequently, a long period of time is necessary for the temperature of the measuring probe to become constant after power is turned on and therefore a standby time till start of measurement is lengthened. Further, in consideration of measuring a convex lens and a concave lens, the length of the probe shaft should be increased, which promotes inclination of the probe shaft and the reflecting plane due to frictional resistance against the measuring target face during measurement, thereby causing a problem that an optical axis toward the corner cube 106a is displaced to cause instable measurement.

SUMMARY OF THE INVENTION

An object of the present invention is to provide a measuring probe, which, compared to each of the described measuring probes, has a simplified constitution to facilitate manufacturing and is downsized to enhance stability of measurement, which further allows replacement of a measuring target object without damaging the measuring target object or a contact portion, and which is further capable of offering almost uniform measuring force within a movable range of the contact portion, as well as a method for using the measuring probe.

In accomplishing the object, the present invention is constituted as shown below.

According to a first aspect of the present invention, there is provided a measuring probe, comprising:

a housing configured to be made of a magnetic material in a cylindrical shape;

a movable member configured to be provided inside the housing along an axis line of the housing, the movable member having a contact portion at one end configured to come into contact with a measuring target face and a reflecting plane formed at the other end configured to reflect a measuring light beam, and being made of a nonmagnetic material in a rod shape;

a magnetic substance configured to be mounted on the movable member;

a bearing made of a magnetic material which is in a cylinder shape with the movable member running through at a center portion, the bearing configured to be press-fitted into the housing and support the movable member movably in axis line direction in a non-contact state;

a magnetic force generating portion configured to be in a cylinder shape with the movable member running through at a center portion and be fitted into the housing, the magnetic force generating portion having a retreat magnetic force generating portion configured to work on the magnetic substance of the movable member and move the movable member toward retreat direction along the axis line direction, and a measurement magnetic force generating potion configured to work on the magnetic substance of the movable member and move the movable member toward measuring direction along the axis line direction; and a cover member configured to be mountable on and demountable from the housing, prevent the magnetic force generating portion and the movable member from dropping off from the housing, and be made of a magnetic material.

In this constitution, the movable member is structured from a nonmagnetic material, and a fixed member composed of the housing and the cover member and the bearing are structured as part of a magnetic circuit, so that magnetic force generated in the magnetic force generating portion can operate in the state of being forced upon the magnetic substance, in other words, the magnetic force can work upon the magnetic substance in an efficient and shortest magnetic circuit. Consequently, it becomes possible to decrease, for example, a winding number of a coil in the magnetic force generating portion and to decrease a current amount. Further, since the fixed member serves as a radiation member and heat generated in the magnetic force generating portion can be released over a wide area, temperature rise can be kept low so that stable measurement with less heat contraction can be achieved. Moreover, since heat is less likely to be trapped inside the fixed member, a period of time taken for the temperature to become constant is shortened and therefore a period of time till measurement is performed after power is turned on is shortened. Further, since the fixed member is structured from the magnetic material, an outside yoke portion constituting the magnetic circuit in the magnetic force generating portion provided on the fixed member can be eliminated, and so in this regard, the shape of the measuring probe can be downsized and a component parts count can be reduced, which delivers economy.

Moreover, with such constitution, when the cover member demounted from the housing, the movable member can be inserted into the housing with its top end portion being able to be inserted into the bearing and they can be extracted from the bearing and the housing, which not only facilitates assembling process during manufacturing but also makes maintenance and management such as replacement of the contact portion due to wear extremely easy.

Further in this constitution, the measuring probe may be designed so that it further comprises a spacer configured to be provided so as to come into contact with the magnetic substance in both end portions of the magnetic force generating portion in the axis line direction, determine a moving amount of the movable member in the axis line direction, and be made of a nonmagnetic material.

According to the constitution having the spacer, since adsorption due to magnetization and suction due to residual magnetism based on the presence of the bearing and the fixed member can be prevented from occurring by the members structured from the nonmagnetic material, i.e., force from the bearing and the fixed member can be blocked, only the magnetic force generated in the magnetic force generating portion can work on the magnetic substance and move the movable member, thereby allowing implementation of stable control.

Further, according to the constitution having the spacer, a movable range of the magnetic substance is structured to be regulated by the member made of the nonmagnetic material, which makes it possible to confine the force acting upon the magnetic substance within a stable moving range.

Further, in the constitution in the first aspect, the measuring probe may be designed so that the measurement magnetic force generating portion is formed from a coil whose winding number is decreased toward the measuring direction so that magnetic field strength is gradually lowered toward the one end side of the movable member and force acting upon the magnetic substance is almost uniformed regardless of a moving amount of the movable member toward the measuring direction.

Furthermore, in this constitution, it may be designed so that the measurement magnetic force generating portion has a first generating portion which is a portion coming close to the retreat magnetic force generating portion and has a length along the axis line direction equal to a length of the retreat magnetic force generating portion, and a second generating portion which is adjacent to the first generating portion and extends in the measuring direction beyond the first generating portion and is formed integrally with the first generating portion for moving the magnetic substance toward the measuring direction over the first generating portion. Further, it may be designed so that a thickness of the measurement magnetic force generating portion in orthogonal direction orthogonal to the axis line direction on a boundary between the first generating portion and the second generating portion is $2/3$ of a thickness of a thickest portion of the measurement magnetic force generating portion, and a thickness of a thinnest portion of the measurement magnetic force generating portion is ½ of the thickness of the thickest portion.

According to such a constitution, the magnetic force generating portion has the measurement magnetic force generating portion and the retreat magnetic force generating portion. Since the measurement magnetic force generating portion is structured such that magnetic field strength is gradually lowered toward the one end portion of the movable member, almost uniform measuring force can act upon the movable member in the movable range of the contact portion moved in the measurement magnetic force generating portion. As an example of the constitution to gradually weaken the magnetic field intensity, the measurement magnetic force generating portion is formed into a shape which tapers down toward the measuring direction so that almost uniform measuring force can work upon the movable member in the movable range of the contact portion moved in the measurement magnetic force generating portion. This makes it possible to prevent the measuring target object from being damaged and also enables the contact portion to move in conformity to the measuring target face even if the measuring target face has sharp projections and depressions. Therefore, even in the case where a scanning velocity of the contact portion is increased and a measuring time is shortened, a high-accuracy measuring result can be obtained.

Moreover, since the housing is in a cylinder shape, the bearing and the magnetic force generating portion can be disposed in the state of being fitted into the housing, and further the movable member is provided so as to go through the center portions of the bearing and the magnetic force generating portion, which allows the constitution of the measuring probe to be considerably simplified and allows manufacturing to be facilitated. Moreover, the measuring probe can be downsized because of the small component member count. Consequently, heat capacity becomes small and therefore the stability of measurement can be increased. Moreover, since the contact portion of the movable member can be retreated from the measuring target face with the operation of the retreat magnetic force generating portion, damages on the measuring target object and the contact portion are prevented.

Moreover, since the length of the retreat magnetic force generating portion along the axis line direction is arranged to be shorter than the length of the magnetic substance along the axis line direction, and there is further provided the spacer which comes into contact with the magnetic substance at both the end portions of the magnetic force generating portion in the axis line direction for regulating a moving amount of the movable member in the axis line direction, it becomes possible to prevent such circumstances that the magnetic substance provided on the movable member is dislocated from the retreat magnetic force generating portion or the measurement magnetic force generating portion and thereby the movable member cannot be moved.

Moreover, there may be further provided a current supply unit for supplying current to the measurement magnetic force generating portion and the retreat magnetic force generating portion. The current supply unit has a first supply portion for supplying a first current to the measurement magnetic force generating portion during measurement of the measuring target face while the contact portion is in contact with the measuring target face, a second supply portion for supplying a second current weaker than the first current to the measurement magnetic force generating portion when the contact portion is brought into contact with the measuring target face, and a change-over switch for connecting the measurement magnetic force generating portion to either one of the first supply portion and the second supply portion.

Having the change-over switch allows magnetic force for moving the movable member in a direction so as to bring the movable member into a contact with the measuring target face and magnetic force for performing measurement in the state that the contact portion of the movable member is in contact with the measuring target face to be in optimum state, respectively. Consequently, it becomes possible to prevent the reflecting plane from inclining and the optical axis from displacing due to vibration generated in the movable member by large magnetic force when the movable member is moved, which prevents a measured value from being reset by instantaneous elimination or reduction in the intensity of interference with a reference light beam caused by the displacement of the optical axis.

Furthermore in this constitution, it is acceptable to structure the measuring probe such that current is constantly applied to either one of the measurement magnetic force generating portion corresponding to a first coil and the retreat magnetic force generating portion corresponding to a second coil.

With such a constitution, the measuring probe is structured such that current is constantly applied to either one of the first coil and the second coil, and therefore the coil of the magnetic force generating portion is destined to constantly generate almost constant heat. This eliminates error of measurement attributed to expansion and contraction of each member during measurement of a number of measuring target objects as is the case where such heat is generated intermittently instead, by which high-accuracy measuring results can be gained.

Further, according to a method for using a measuring probe in a second aspect of the present invention, there is provided a method for using a measuring probe which supports a movable member movably in axis line direction of the movable member, the movable member having a contact portion which comes into contact with a measuring target face at one end and having a reflecting plane formed at the other end for reflecting a measuring light beam, the method comprising:

bringing the contact portion of the movable member into contact with the measuring target face with a second current configured to bring the contact portion into contact with the measuring target face; and after bringing the contact portion into contact, starting measurement of the measuring target face in a state the contact portion is pressed to the measuring target face with a first current configured to be stronger than the second current and press the contact portion to the measuring target face with force allowing movement in conformity to the measuring target face.

According to such a constitution, a measuring probe can be manufactured simply by the steps of fitting the bearing and the magnetic force generating portion into the housing, inserting the movable member into these center portions, and mounting the cover member on the housing. This allows the constitution of the measuring probe to be considerably simplified and allows manufacturing to be facilitated. Moreover, the small component member count enables the measuring probe to be downsized. Consequently, heat capacity becomes small and therefore the stability of measurement can be increased.

The above method using the measuring probe of the second aspect may be designed so that the method further comprises:

storing in advance a retreat position at which the movable member is positioned with the contact portion being away from the measuring target face, and after it is confirmed based on the stored memory that the movable member is positioned at the retreat position, bringing the contact portion into contact with the measuring target face with the second current.

According to such a constitution, in the case of measuring flatness of the measuring target face and the like, it becomes possible to measure a position of the reflecting plane at the retreat position where the measuring target face is not present, store the data of the position in a storage portion, confirm that the reflecting plane is positioned at the position which is stored in the storage portion, and then move the movable member to a measuring position to start measurement. This allows smooth progress of the measurement and prevents a measuring target from being hit by the contact portion of the measuring probe or the side face of the movable member to cause damages.

Therefore, according to the present invention, compared to the conventional measuring probe having two parallel plate springs, movement in conformity to the measuring target face is drastically improved and no hysteresis is found so that measuring accuracy can be enhanced. Moreover, it becomes possible to eliminate inclination of the reflecting plane due to the projections and depressions of the measuring target face so as to enhance the measuring accuracy. Further, manufacturing and replacement processes of the measuring probe are facilitated and horizontal placement becomes available. Further, the constitution of the measuring probe is simplified so as to facilitate manufacturing process, and the measuring probe is downsized to decrease the heat capacity so that a period of time taken for the temperature to be constant after power is turned on can be shortened and the stability of measurement can be increased. Moreover, it becomes possible to replace the measuring target objects without damaging the measuring target objects or the contact portion, while manufacturing of the measuring probe and replacement of probe shafts are facilitated.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
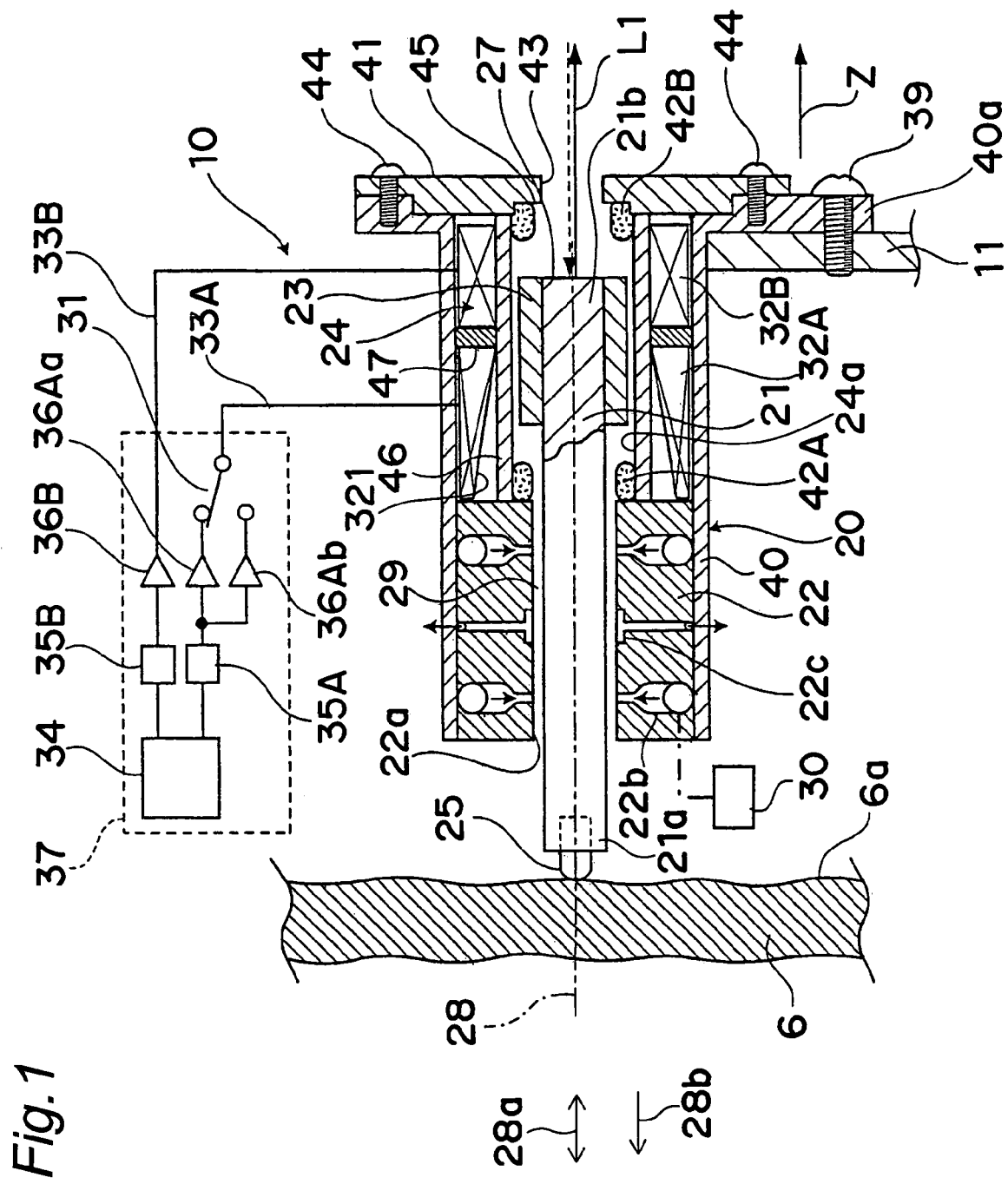
FIG. 1 is a cross sectional view showing a measuring probe in an embodiment of the present invention in a measuring state.

Hereinbelow, the embodiment of the present invention will be described in detail with reference to the drawings. It is to be noted that like parts are designated by like reference numerals throughout the accompanying drawings.

First, description is given of a measuring probe in one embodiment.

Figure 2:
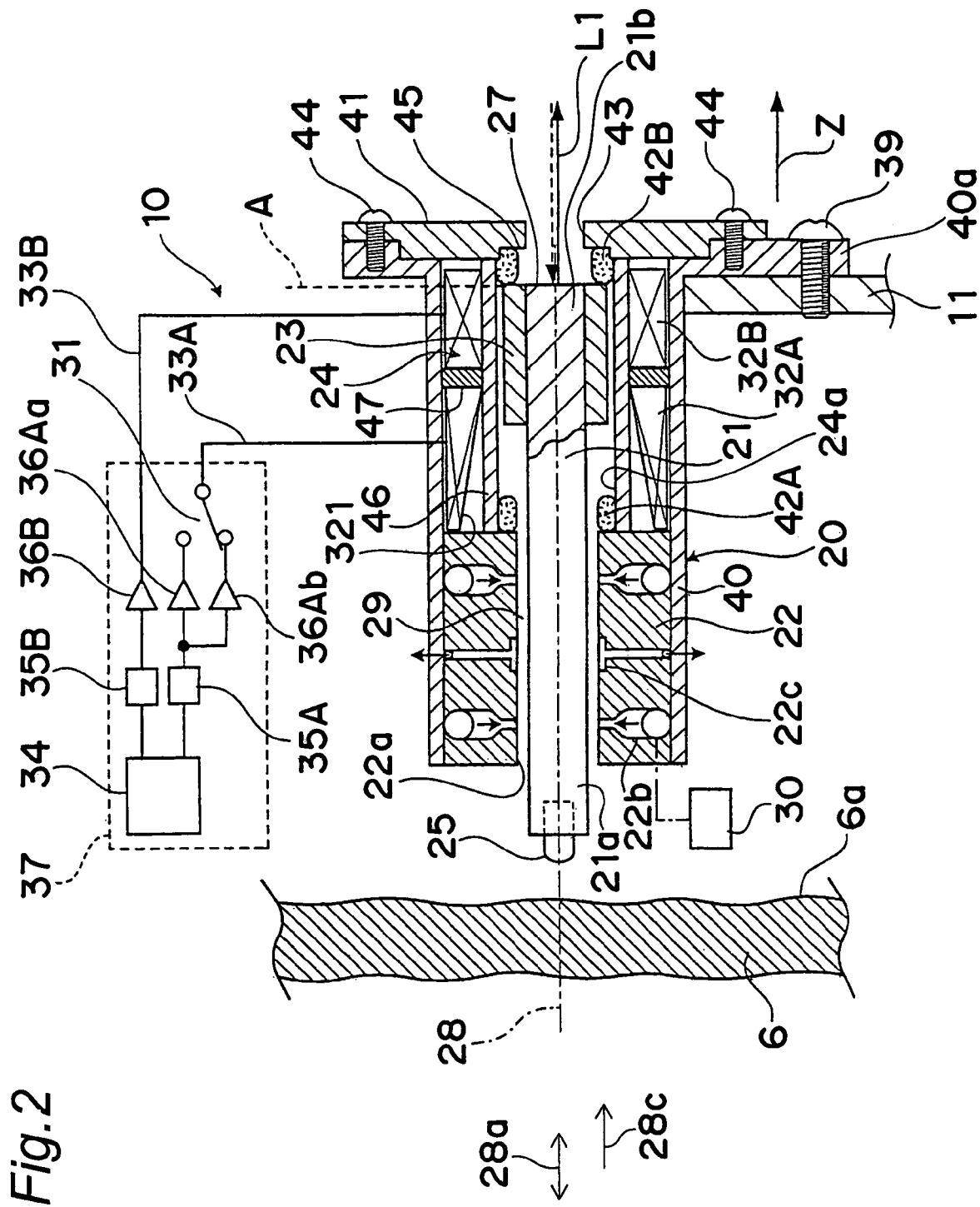
FIG. 2 is a cross sectional view showing the measuring probe of FIG. 1 in a not-measuring state.
Figure 3:
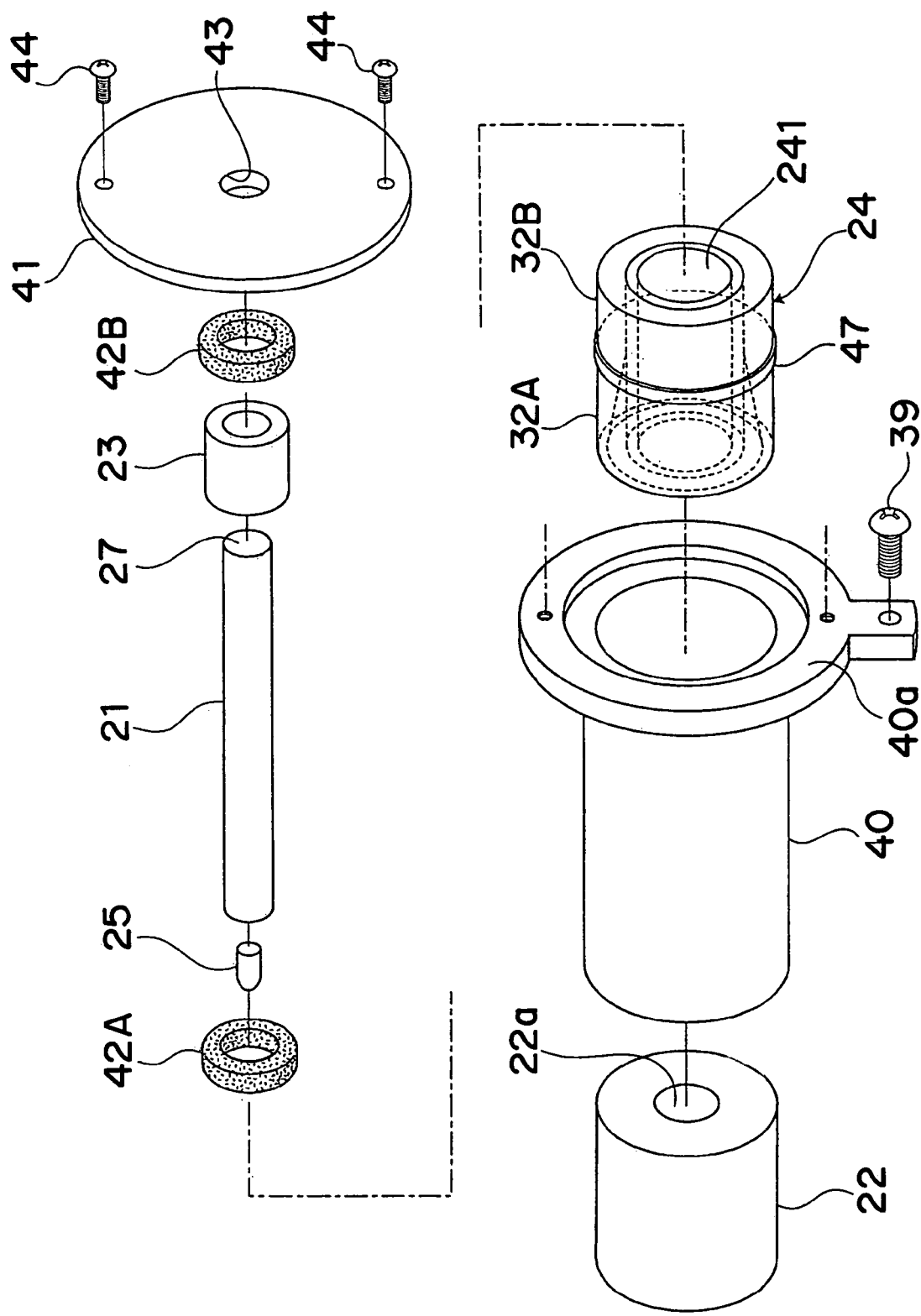
FIG. 3 is a exploded perspective view showing primary parts of the measuring probe of FIG. 1 and FIG. 2.

FIG. 1 shows a state in which a movable member 21 included in a measuring probe 10 according to one embodiment of the present invention is moved in a measuring direction 28b so as to bring a contact portion 25 into contact with a wafer 6 for obtaining information on a surface 6a of the wafer 6, i.e., measuring a position of the surface 6a or its changes. The wafer 6 is equivalent to one example of a measuring target object and the surface 6a of the wafer 6 is equivalent to one example of a measuring target face. FIG. 2 shows a state that the movable member 21 of the same measuring probe 10 is moved in a retreat direction 28c so as to place the contact portion 25 away from the wafer 6, i.e., a state that the wafer 6 is attached to or detached from a measuring apparatus. FIG. 3 is a configuration view showing primary parts of the measuring probe shown in FIG. 1 and FIG. 2, FIG. 4 is a perspective view showing a thickness fluctuation measuring apparatus as an example of an optical measuring apparatus having the measuring probe 10 of FIG. 1 to FIG. 3, and FIG. 5 is a view showing optical paths of a reference light beam and a measuring light beam in an optical displacement gauge included in the thickness fluctuation measuring apparatus of FIG. 4.

Figure 4:
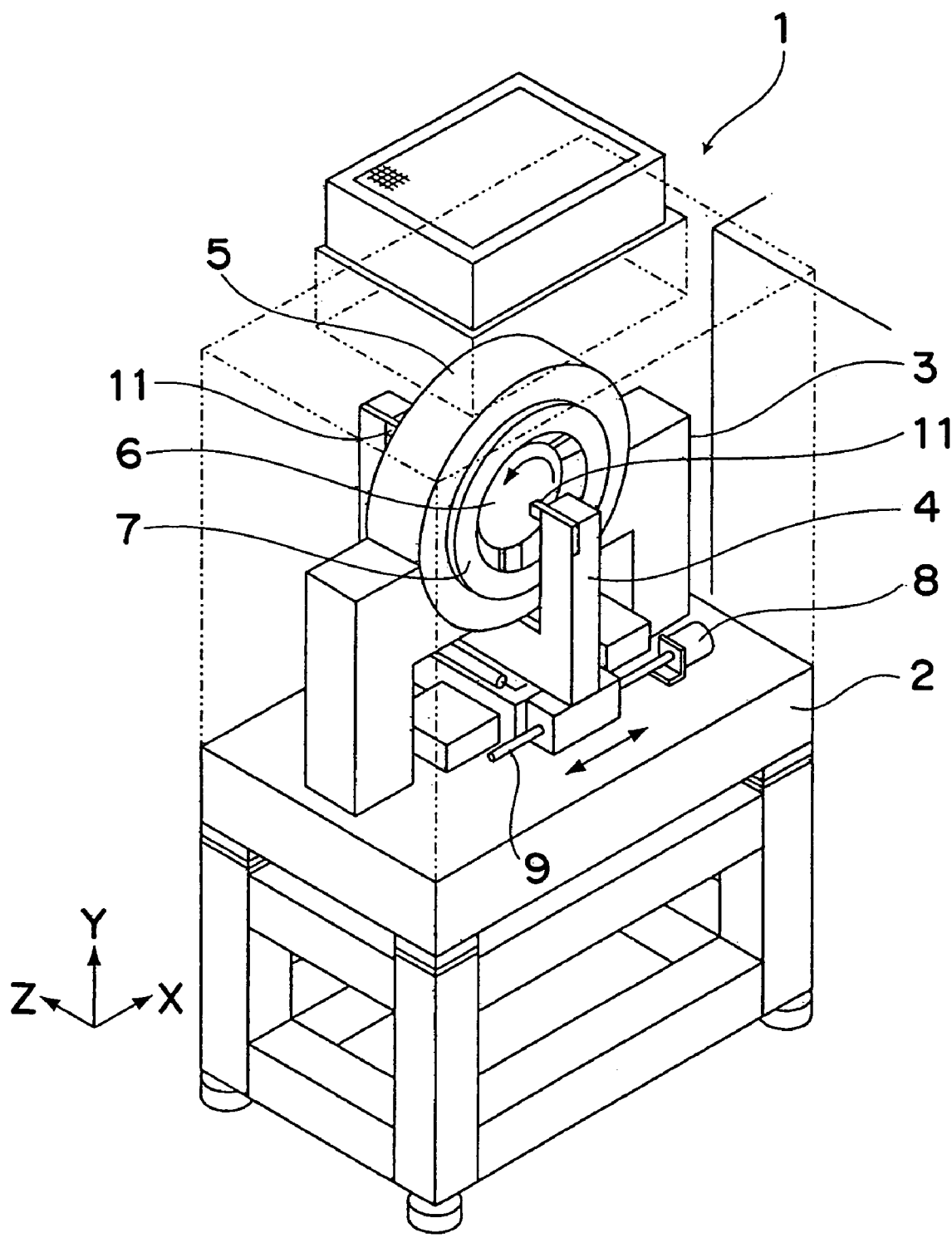
FIG. 4 is a perspective view showing a thickness fluctuation measuring apparatus having the measuring probe of FIG. 1 to FIG. 3.

As shown in FIG. 4, the thickness fluctuation measuring apparatus 1 is composed of a wafer retaining stage 3 and a sensor moving stage 4 on a table 2. The wafer retaining stage 3 is composed of a direct drive motor 5 and a circular spindle 7. The spindle 7 is rotationally driven on an XY-axis plane in the drawing and retains the disc-like wafer 6 as a target for thickness fluctuation measurement in its inner circumference portion. The sensor moving stage 4 is movable in X-axis direction along a guide by a ball screw 9 rotated by a motor 8 and has optical displacement gauges 11, 11 on both sides of the wafer 6.

Figure 5:
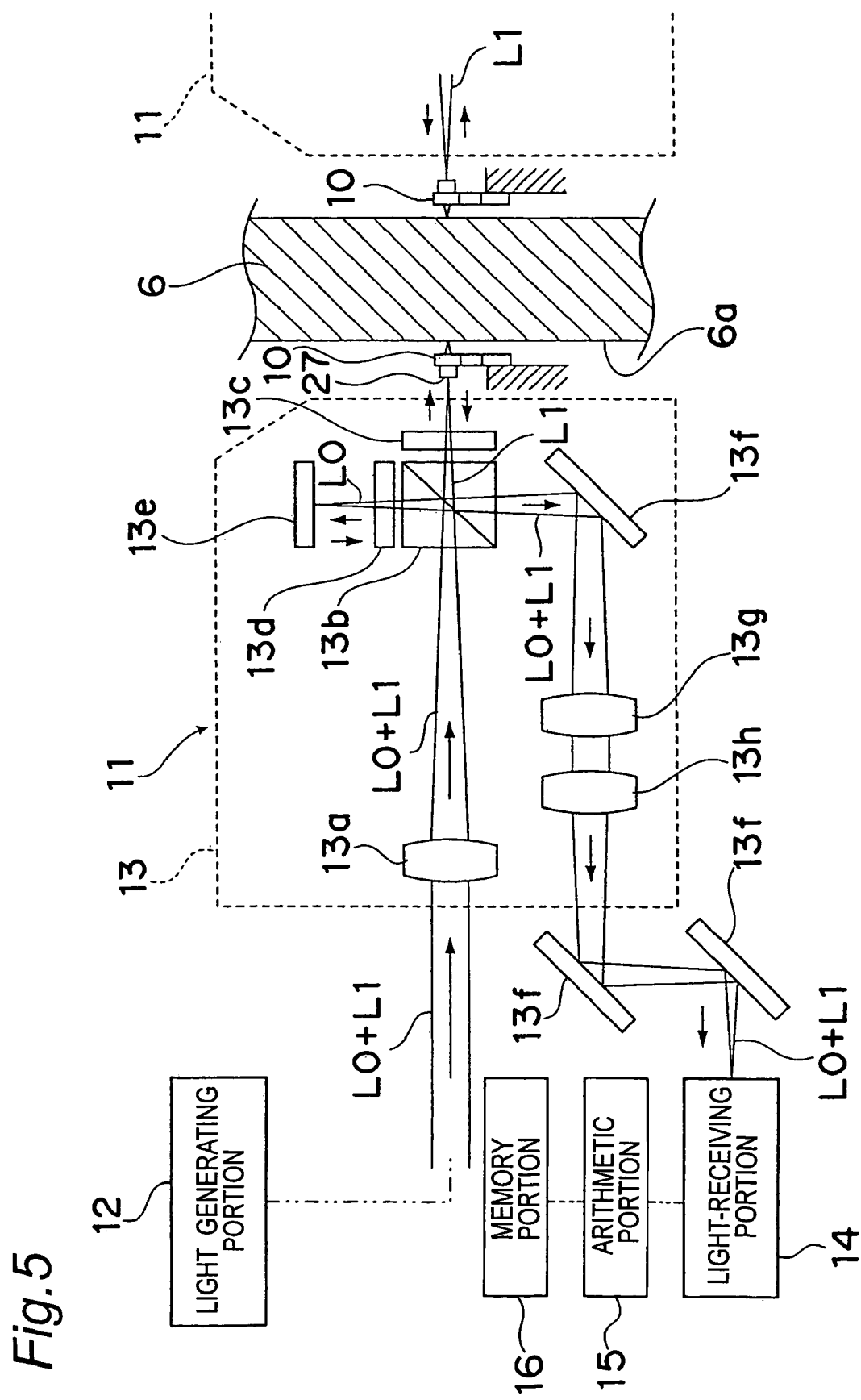
FIG. 5 is a view showing optical paths of a reference light beam and a measuring light beam in the thickness fluctuation measuring apparatus of FIG. 4.

FIG. 5 shows the constitution of one of the optical displacement gauges 11, 11 on both sides of the wafer 6. The other optical displacement gauge 11 share the same structure.

Each of the optical displacement gauges 11 is composed of, according to the present embodiment, a measuring probe 10, a light generating portion 12, a measurement optical system 13, a light receiving portion 14 and an arithmetic portion 15. A memory portion 16 as a storage portion can be further included. The light generating portion 12 has a laser output apparatus for outputting a frequency stabilization He—Ne laser beam so as to feed an output light beam L0+L1 formed by mixing a reference light beam L0 and a measuring light beam L1 to the measurement optical system 13.

In the measurement optical system 13, the output light beam L0+L1 is converged by a convergence lens 13a, and then is fed to a polarizing beam splitter 13b serving as a divider/combiner portion. The convergence lens 13a converges the output light beam L0+L1 so as to accurately focus the measuring light beam L1 on a reflecting plane 27 of the measuring probe 10 which is in contact with the surface 6a of the wafer 6. In the polarizing beam splitter 13b, while the measuring light beam L1 travels straight, the reference light beam L0 reflects in orthogonal direction, so that both the light beams are split. This split is attributed to difference in direction of polarization between the measuring light beam L1 and the reference light beam L0.

The measuring light beam L1 goes through a λ/4 plate 13c, and then goes toward the measuring probe 10 positioned in the vicinity of the surface 6a of the wafer 6. Then, the measuring light beam L1 is reflected by the reflecting plane 27 of the measuring probe 10, and is returned to the beam splitter 13b. The reference light beam L0 coming from the polarizing beam splitter 13b goes through a λ/4 plate 13d and is reflected by a reference mirror 13e before returning to the polarizing beam splitter 13b. A distance from the polarizing beam splitter 13b to the reference mirror 13e is set to be equal to a distance from the polarizing beam splitter 13b to the measuring probe 10.

The reference light beam L0 reflected by the reference mirror 13e goes straight through the polarizing beam splitter 13b, while the measuring light beam L1 reflected by the reflecting plane 27 of the measuring probe 10 is reflected by the polarizing beam splitter 13b and goes in the same direction as that of the reference light beam L0. As a result, a mixed light beam L0+L1 composed of the reference light beam L0 and the measuring light beam L1 is outputted from the polarizing beam splitter 13b. While a travel of the measuring light beam L1 is changed by the distance to the reflecting plane 27 of the measuring probe 10 having a displacement structure, a travel of the reference light beam L0 is constant, and therefore the mixed light beam L0+L1 outputted from the polarizing beam splitter 13b has a travel difference or a phase difference between both the light beams.

The mixed light beam L0+L1 outputted from the polarizing beam splitter 13b passes through a collimate lens 13g, a focus lens 13h and a plurality of mirrors 13f before coming incident into the light receiving portion 14. The light receiving portion 14 converts an optical signal to an electrical signal. The arithmetic portion 15 performs electric analysis on wavelengths and phases of the reference light beam L0 and the measuring light beam L1 and performs arithmetic processing over the resultant data so as to obtain a position of the surface 6a of the wafer 6 or its changes as numerical data. In the memory portion 16, a part of the numerical data obtained through arithmetic processing in the arithmetic portion 15 is stored.

Such measurement is performed at various places along the surface 6a of the wafer 6, by which changes of the surface position of the wafer 6, i.e., displacement, is identified. With the optical displacement gauges 11, 11 disposed on both sides of the wafer 6, the surface displacement of the wafer 6 is measured, respectively. A sum of the surface displacement values on both sides of the wafer 6 represents a thickness fluctuation of the wafer 6. It is to be noted that in measurement of the thickness fluctuation, it is not necessary to measure the thickness of the wafer 6 itself but a difference or dispersion of the thickness in plane direction should be measured as thickness fluctuation. It is to be noted that if an interval between the left-side and right-side optical displacement gauges 11, 11 is known, then it becomes possible to identify the thickness of the wafer 6 from positional data on the wafer 6 with respect to both the optical displacement gauges 11, 11.

It is to be noted that as an example of the surface displacement values of the wafer 6 measured with use of the measuring probe, a peak to valley difference (PV) on the projections and depressions of the surface 6a is approx. 100 μm, and error of measurement (σ) is several dozen nm. Further, the measuring target object is not limited to the wafer 6 but includes objects such as aspherical lenses and optical disks which require error tolerance level of nm order.

As shown in FIG. 5, the measuring probe 10 is disposed in a position in the vicinity of the surface 6a of the wafer 6, which is the measuring target face, in radiation direction of the measuring light beam L1 of the optical displacement gauge 11. In this case, the measuring probe 10 is disposed in horizontal direction.

With reference to FIG. 1 to FIG. 3, description is given of the constitution of the measuring probe 10. The measuring probe 10 has a fixed member 20 which is fixed onto the optical displacement gauge 11 and a rod-shaped movable member 21 which can freely move in conformity to the projections and depressions on the surface 6a of the wafer 6 as the measuring target object and which is disposed inside a housing 40 constituting the fixed member 20. The fixed member 20 is composed of the housing 40 for accommodating an air bearing 22 and a magnetic force generating portion 24 and a cover 41. A flange 40a is formed on one end portion of the housing 40 on the side of the optical displacement gauge 11, and the flange 40a is fixed onto the optical displacement gauge 11 with screws 39 so that the measuring probe 10 is fixed onto the optical displacement gauge 11. It is to be noted that for one working example, the housing 40 is a cylindrical member having an external diameter of approx. 10 mm.

To a top end of one end portion 21a of the movable member 21 protruding from the housing 40 in the fixed member 20, a contact portion 25 made of diamond and the like which comes into contact with the surface 6a of the wafer 6 is bonded with an adhesive and the like. On an end face of a base end portion 21b corresponding to the other end of the movable member 21 on the opposite side of the one end portion 21a, there is formed a reflecting plane 27 which is mirror polished so as to reflect the measuring light beam L1. A cylinder-shaped magnetic substance 23 made of steel and the like is fixed onto the base end portion 21b of the movable member 21 in the state of being fitted from the outside. It is to be noted that for one working example, the movable member 21 is a column-shaped rod member having an external diameter of approx. 1 mm.

In the housing 40 constituting the fixed member 20, the air bearing 22 is fixed onto a portion corresponding to the top end portion of the movable member 21 in the state of being fitted from the inside, and the circular magnetic force generating portion 24 is fixed onto a portion corresponding to the magnetic substance 23 of the movable member 21 in the state of being fitted from the inside. As shown in FIG. 3, each of the air bearing 22 and the magnetic force generating portion 24 is formed into a cylinder shape and is constituted from packaged members so as to be easily pressed into the housing 40 and set therein.

Further, a spacer 42A is press-fitted into an inside face 24a of the magnetic force generating portion 24 so as to be adjacent to the bearing 22.

Moreover, as shown in FIG. 3, the top end portion of the movable member 21 is inserted into an insertion hole 22a of the air bearing 22 in the housing 40, and the movable member 21 is inserted into a center hole 241 of the magnetic force generating portion 24. In this state, the cover 41 is put on the flange 40a of the housing 40, and is fixed to the housing 40 by screws 44 via the flange 40a. The cover 41 has a hole 43 formed in its center portion, the hole 43 having a diameter smaller than the external diameter of the magnetic substance 23 and allowing the measuring light beam L1 to pass therethrough. Further, a spacer 42B is press-fitted into a notch portion 45 formed adjacent to the hole 43.

As is described, packaged air bearing 22 and the magnetic force generating portion 24 are press-fitted into the housing 40, and the movable member 21 is disposed so as to be inserted into the insertion hole 22a of the air bearing 22 and the center hole 241 of the magnetic force generating portion 24, with the cover 41 being mounted thereon so as to ensure that the air bearing 22, the magnetic force generating portion 24 and the movable member 21 are prevented from dropping off from the housing 40. This constitution not only facilitates assembling process during manufacturing but also makes maintenance and management such as replacement of the contact portion 25 due to wear extremely easy.

It is to be noted that the movable member 21 is inserted into the insertion hole 22a having a circular cross section and extending in axis direction, and a space 29 is formed between a hole wall of the insertion hole 22a and an outer circumferential face of the movable member 21, by which the air bearing 22 is constituted. The air bearing 22 has a plurality of air inlets 22b and a plurality of air outlets 22c open on the hole wall of the insertion hole 22a. Air with a specified pressure from an air supply source 30 is supplied to the space 29 through the air inlets 22b while air is discharged from the space 29 through the air outlets 22c. With the virtue of the air flow, the space 29 functions as the air bearing which supports the movable member 21. Since the air bearing 22 supports the movable member 21 in a non-contact state, the movable member 21 can move in the direction of its axis line 28 as stated above, though not in other directions during normal operation.

In the above-structured measuring probe 10, the movable member 21 is constituted from a nonmagnetic material such as aluminum, and the housing 40 and the cover 41 constituting the air bearing 22 and the fixed member 20 are made of a magnetic material such as stainless steel SUS430 and the like. Moreover, a casing 46 of the magnetic force generating portion 24 is formed from a nonmagnetic material, while a yoke 47 partitioning a coil 32A and a coil 32B is formed from a magnetic material. Therefore, magnetic force generated in the coil 32A works upon the magnetic substance 23 through a magnetic circuit formed by the housing 40, the air bearing 22 and the yoke 47, whereas a magnetic field generated in the coil 32B works upon the magnetic substance 23 through a magnetic circuit formed by the housing 40, the cover 41 and the yoke 47. It is to be noted that the cover 41 is structured so as to prevent the movable member 21 from slipping off from the housing 40, and therefore the magnetic substance 23 and the cover 41 are positioned face to face through the spacer 42B, whereas the magnetic field generated in the coil 32B works upon the magnetic substance 23 through a shortest magnetic circuit formed by the cover 41 and the yoke 47.

Therefore, the magnetic force generated in the magnetic force generating portion 24 acts on the magnetic substance 23 in the state of being converged. Consequently, it becomes possible to decrease a winding number of the coil in the magnetic force generating portion 24 and to decrease a current amount, thereby allowing the probe 10 to be downsized and heat generation to be decreased. Further, since the housing 40 and the cover 41 serve as heat radiation members, and heat generated in the coils 32A and 32B can be released over a wide area, temperature rise can be kept low so that the probe 10 with sufficient thermal instability can be obtained. Moreover, since air in the air bearing 22 flows along the movable member 21 so that heat is less likely to be trapped inside the measuring probe 10, a period of time taken for the temperature to become constant is shortened and therefore a period of time till measurement is performed after power is turned on is shortened. Further, a component member count is reduced so that an economic and a small-size probe 10 can be achieved.

The spacer 42A is disposed between the magnetic substance 23 and the air bearing 22 along the direction of the axis line 28, whereas the spacer 42B is disposed between the magnetic substance 23 and the cover 41 along the direction of the axis line 28. These spacers 42A and 42B are made of a nonmagnetic material such as resin. Therefore, in the case where two magnetic materials, the magnetic substance 23 and the air bearing 22, or two magnetic materials, the magnetic substance 23 and the cover 41, are close to each other, adsorption due to magnetization caused by application of magnetic fields and suction due to residual magnetism can be prevented from occurring and only the magnetic force generated in the magnetic force generating portion 24 can work on the magnetic substance 23 to move the movable member 21 in axis line direction, thereby allowing implementation of stable control. As a result, even if the measuring state that current is supplied to the coil 32A is abruptly switched to the state that current is supplied to the coil 32B and the wafer 6 can be freely attached or detached, or vise versa, the movable member 21 can still smoothly move.

The magnetic force generating portion 24 is composed of the cylindrical casing 46 composed of a nonmagnetic material for forming the center hole 241, and two coils 32A, 32B partitioned by the yoke 47 which is provided in the center portion of the casing 46 and is made of magnetic material. The coil 32A is a coil which helps magnetic force to act upon the magnetic substance 23 in the direction to press the contact portion 25 to the surface 6a of the wafer 6 that is the measuring target face, i.e., in the measuring direction 28b, and which corresponds to the first coil and the measurement magnetic force generating portion. The coil 32B is a coil which helps magnetic force to act upon the magnetic substance 23 in the direction to pull the contact portion 25 away from the surface 6a of the wafer 6 that is the measuring target face, i.e., in the retreat direction 28c, and which corresponds to the second coil and the retreat magnetic force generating portion.

Figure 8:
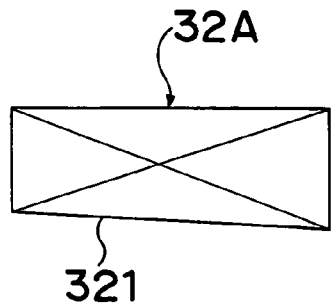
FIG. 8 is a view showing a modified example of the measurement magnetic force generating portion included in the measuring probe of FIG. 1 to FIG. 3.
Figure 9:
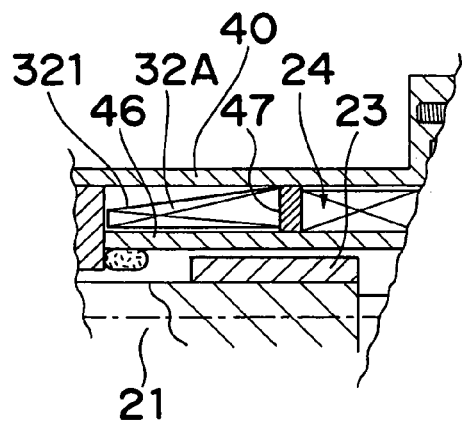
FIG. 9 is a view showing a modified example of the measurement magnetic force generating portion included in the measuring probe of FIG. 1 to FIG. 3.

The coil 32A is a coil structured so that magnetic field intensity is gradually lowered toward the side of one end 21a of the movable member 21. As an example of the constitution to gradually weaken the magnetic field intensity, the coil 32A is formed into a shape which tapers down toward the measuring direction 28b so that almost constant force acts upon the magnetic substance 23 regardless of a moving amount of the movable member 21 to the measuring direction 28b. More particularly, as described later, the coil 32A is a coil with a winding number of the coil decreased toward the measuring direction 28b. It is to be noted that the tapered shape of the coil 32A is not limited to the shape shown in FIG. 1 and the like, and so the shape shown in FIG. 8 is also acceptable. More particularly, the degree of inclination of a hypotenuse 321 of the coil 32A forming the tapered shape can appropriately be designed in accordance with suppress strength of the contact portion 25 to the measuring target object, the winding number of the coil which forms the coil 32A, current supplied to the coil 32A and the like. Moreover, since force acting upon the magnetic substance 23 can be kept almost constant regardless of a moving amount of the movable member 21 in the measuring direction 28b, the hypotenuse 321 of the coil 32A forming the tapered shape should preferably be disposed such that as the movable member 21 moves in measuring direction 28b, a distance between the magnetic substance 23 and the coil 32A increases as shown in FIG. 1 and other drawings. It is also possible to dispose the hypotenuse 321 on the side of the housing 40 of the fixed member 20 as shown in FIG. 9.

By the action of the magnetic force from the coil 32A and the coil 32B upon the magnetic substance 23, the movable member 21 is moved in the measuring direction 28b and the retreat direction 28c. Consequently, if the movable member 21 is positioned at a retreat position 211 by the action of the coil 32B as shown by a solid line in FIG. 10, the magnetic force by the coil 32A needs to act upon the magnetic substance 23 for moving the movable member 21 in the measuring direction 28b. Similarly, as shown by a virtual line in FIG. 10, if the movable member 21 is positioned at a measuring position 212 by the action of the coil 32A, the magnetic force by the coil 32B needs to act upon the magnetic substance 23 for moving the movable member 21 in the retreat direction 28c. More particularly, as one of the conditions for allowing the movable member 21 to move even if it is positioned at the retreat position 211 and the measuring position 212, the magnetic substance 23 is formed to have such a length that a part of the magnetic substance 23, e.g., one end 23a of the magnetic substance 23, overlaps with a part of the coil 32A when the movable member 21 is positioned at the retreat position 211. Moreover, a length L2 of the coil 32B along an axis line direction 28a may be set shorter than a length L1 of the magnetic substance 23 of the movable member 21 along the axis line direction 28a.

Moreover, for the almost uniform measuring force to act upon at least a moving range of the movable member 21, a length L3 of the coil 32A along the axis line direction 28a should preferably exceed the length L2 of the coil 32B. It is to be noted that a minimum value of the length L3 of the coil 32A corresponds to the length L2 of the coil 32B. Moreover, for one working example, the length L2 of the coil 32B is 8 mm and the length L3 of the coil 32A is 12 mm.

When the coil 32A has a length beyond the length L2 of the coil 32B, the coil 32A is formed integrally from a first generating portion 322 and a second generating portion 323. The first generating portion 322 is a portion adjacent to the coil 32B and having a length equal to the length L2 of the coil 32B. The second generating portion 323 is a portion adjacent to the first generating portion 322, extending beyond the first generating portion 322 to the measuring direction 28b and formed integrally with the first generating portion 322 so as to move the magnetic substance 23 over the first generating portion 322 in measuring direction 28b. Thus, the coil 32A is formed from the first generating portion 322 and the second generating portion 323 and is formed into the above-stated tapered shape, by which the almost uniform measuring force can act upon the movable member 21 in the movable range of the movable member 21.

For one working example of the coil 32A, a thickness T2 of the coil 32A in orthogonal direction 28d orthogonal to the axis line direction 28a on a boundary portion 324 between the first generating portion 322 and the second generating portion 323 corresponds to ⅔ of a thickness T1 of a thickest portion of the coil 32A. Further, a thickness T3 of a thinnest portion of the coil 32A corresponds to ½ of the thickness T1 of the thickest portion.

Reference numeral 37 shown in FIG. 1 represents a current supply unit having a micro computer 34, a first current supply circuit 33A for supplying current to the coil 32A, and a second current supply circuit 33B for supplying current to the coil 32B. The first current supply circuit 33A has a D/A converter 35A, an amplifier 36Aa, an amplifier 36Ab capable of supplying a current weaker than that of the amplifier 36Aa to the coil 32A, and a change-over switch 31 for switching these amplifiers 36Aa, 36Ab. The second current supply circuit 33B has a D/A converter 35B and an amplifier 36B. It is to be noted that the amplifier 36Aa corresponds to one example functioning as the first supply portion, and a current supplied from the amplifier 36Aa to the coil 32A is to be the first current. The amplifier 36Ab corresponds to one example functioning as the second supply portion, and a current supplied from the amplifier 36Ab to the coil 32A is to be the second current.

Therefore, when the current is supplied from the current supply unit 37 to the coil 32A, the contact portion 25 is pressed to the surface 6a of the wafer 6 as shown in FIG. 1. When the current of the coil 32A is stopped and the current is supplied to the coil 32B, the contact portion 25 is pulled away from the surface 6a of the wafer 6 as shown in FIG. 2, which allows the wafer 6 to be freely attached to or detached from the thickness fluctuation measuring apparatus 1 shown in FIG. 4.

Figure 6B:
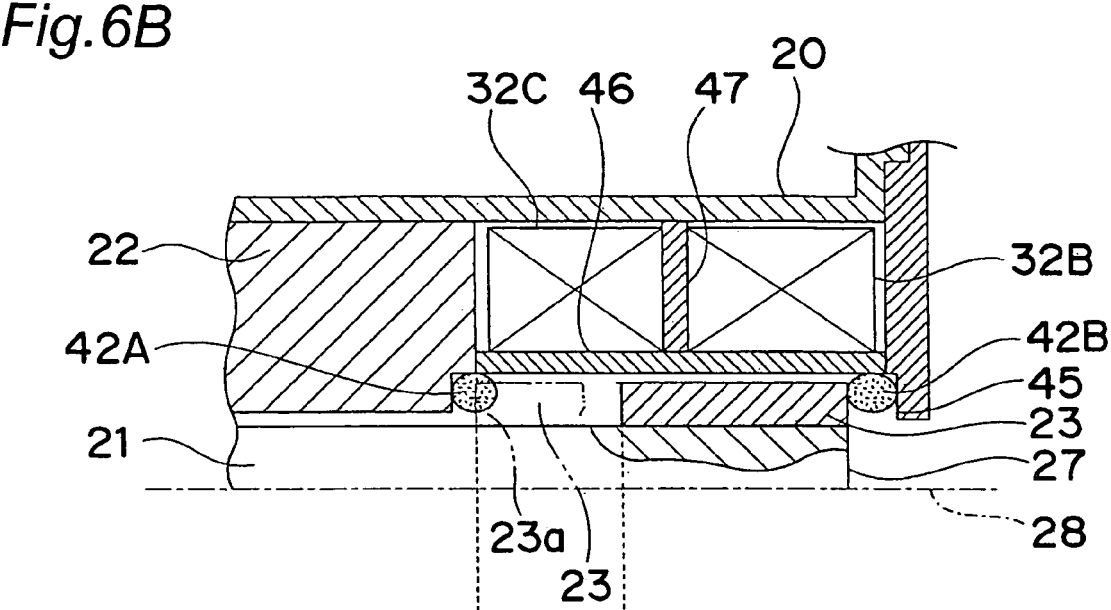
FIG. 6B is a fragmentary cross sectional view showing a measuring probe in the case where a measurement magnetic force generating portion and a retreat magnetic force generating portion share an identical structure.
Figure 6A:
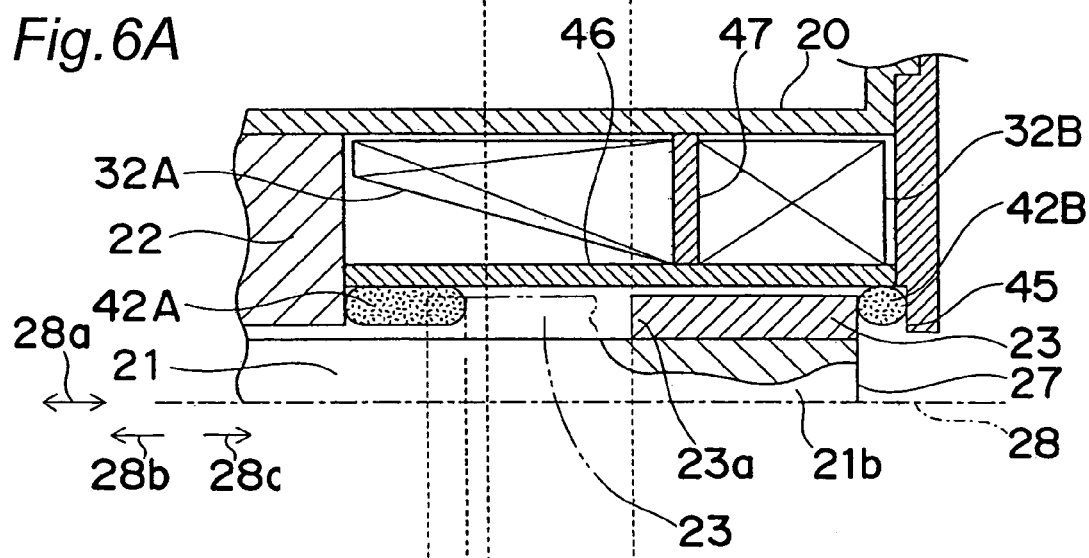
FIG. 6A is a fragmentary cross sectional view showing the measuring probe shown in FIG. 1.
Figure 6C:
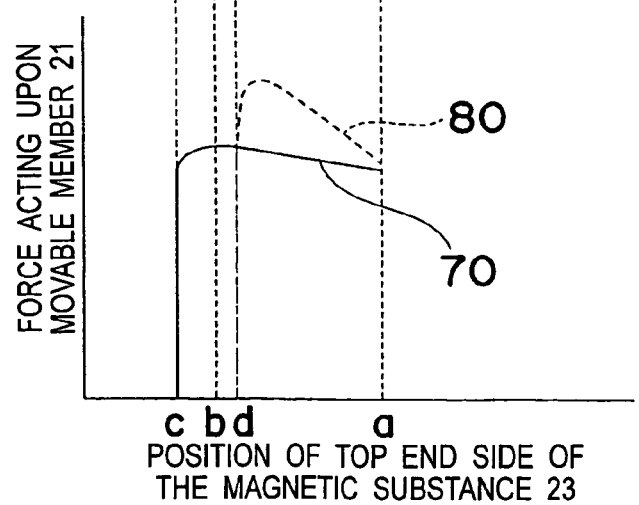
FIG. 6C is a graph view showing a relation between a magnetic substance position and force acting upon a movable member in each of the measuring probes shown in FIG. 6A and FIG. 6B.

FIG. 6A to FIG. 6C are views showing the relation between the magnetic substance 23 and the magnetic force generating portion 24, in which FIG. 6A and FIG. 6B are fragmentary cross sectional views showing the relation between the magnetic substance 23 and the magnetic force generating portion 24, and FIG. 6C is a curve view showing the relation between a position of the magnetic substance 23 and force acting upon the movable member 21. More specifically, FIG. 6A is a fragmentary cross sectional view showing only the upper portion of the magnetic substance 23 and the magnetic force generating portion 24 above the axis line 28 for showing the configuration of the embodiment of the present invention. FIG. 6B is a fragmentary cross sectional view showing a probe in the case where a measurement magnetic force generating portion 32C corresponding to the coil 32A is formed with the same constitution as the coil 32B.

In a more preferred embodiment of the present invention, as shown in FIG. 6A, the coil 32A pressing the contact portion 25 which comes into contact with the measuring target face 6a is structured such that the winding number is fewer on the top end side 21a of the movable member 21 than on the side of the base end portion 21b, and the magnetic field intensity of the coil 32A is weaker on the top end side 21a of the movable member 21. Further, when the current is applied to a lead wire of the coil 32A, since the magnetic field intensity is in proportion to the amount of current and is in inverse proportion to the cube of a distance from the lead wire, the winding number is decreased at the inside of the coil 32A. More particularly, the portion with a decreased winding number is structured so as to be equal in the external diameter of the coil 32A but so as to be larger in the inner diameter in comparison with other portions.

When the current is supplied to the coil 32B for pulling the contact portion 25 away from the measuring target face, the movable member 21 having the magnetic substance 23 is moved by the virtue of a generated magnetic field, and so the magnetic substance 23 comes into contact with the spacer 42B which is positioned on the side of the base end portion 21b of the movable member 21 and is made of a nonmagnetic material to stop the movable member 21. The position of the one end 23a of the magnetic substance 23 at this point is referred to as "a". Next, once the current of the coil 32B is stopped and the current is supplied to the coil 32A, the movable member 21 is moved in the measuring direction 28b, and if there is no measuring target object, the one end 23a of the magnetic substance 23 comes into contact with the spacer 42A which is provided on the side of the top end 21a of the movable member 21 and is made of a nonmagnetic material to stop the movable member 21. The position of the one end 23a in the magnetic substance 23 at this point is referred to as "b". Consequently, the movable range of the movable member 21 in the measuring probe 10 is from "a" to "b". It is to be noted that the spacers 42A and 42B regulate the movable range of the magnetic substance 23 to be the range allowing the movable member 21 to move in a stable state.

Herein, assuming that the measuring target object and the spacer 42A should not be present, the movable member 21 stops at a position where the magnetic substance 23 is stopped moving by the magnetic force generated by the coil 32A. The position of the one end 23a of the magnetic substance 23 at this point is referred to as "c". When the movable member 21 is stopped at the position "c", the force acting upon the magnetic substance 23 to move the movable member 21 in the measuring direction 28b becomes zero. It is to be noted that providing the second generating portion 323 for the coil 32A as described above allows the position "c" to be set closer to the side of the measuring target object. Therefore, as described below, in the section from "a" to "b", that is the movable range of the movable member 21, almost uniform measuring force can be obtained with more reliability. A curve 70 shown in FIG. 6C shows the relation, in the case of providing the coil 32A, between the position of the magnetic substance 23 which moves from "a" to "c" and the force acting upon the movable member 21.

FIG. 6B is a fragmentary cross sectional view showing the configuration of the measurement magnetic force generating portion 32C sharing the same constitution as that of the coil 32B, in which a lead wire is wound uniformly. In this structure, once the current is supplied to the measurement magnetic force generating portion 32C, if the spacer 42A is not present, then the movable member 21 is stopped at the position where the magnetic substance 23 is stopped moving by the virtue of the magnetic force generated by the measurement magnetic force generating portion 32C. The position of the one end 23a of the magnetic substance 23 at this point is referred to as "d". A curve 80 in FIG. 6C shows the relation, in the case of providing the measurement magnetic force generating portion 32C, between the position of the magnetic substance 23 and the force acting upon the movable member 21. It is to be noted that FIG. 6C is a graph view showing a relative relation between the curve 70 and the curve 80, and therefore specific numerical values of the acting force cannot be presented on the vertical axis.

In comparison between the curve 70 and the curve 80, a distance from the position "a" of the one end 23a of the magnetic substance 23 when the magnetic substance 23 is in contact with the spacer 42B to the position of the one end 23a of the magnetic substance 23 when the force acting upon the movable member 21 becomes zero is longer in the curve 70, i.e., in the present embodiment having the coil 32A. In the case of the curve 80, i.e., in the case of having the measurement magnetic force generating portion 32C sharing the same constitution as that of the coil 32B, the force acting upon the movable member 21 is rapidly increased when the movable member 21 is started moving, whereas in the case of the curve 70, i.e., in the case of the present embodiment having the coil 32A, the force is gradually increased. More particularly, the coil 32A makes the force acting upon the movable member 21 almost uniform. This is because, as described above, the coil 32A is shaped to be tapered toward the measuring direction 28b, the length L3 of the coil 32A is made longer than the length L2 of the coil 32B, and the coil 32A is formed from the first generating portion 322 and the second generating portion 323. It is to be noted that forming the coil 32A into a tapered shape signifies that the winding number of the coil 32A is fewer on the side of the top end 21a of the movable member 21 than on the side of the base end portion 21b, and the magnetic field intensity of the coil 32A is weaker on the top end side of the movable member 21. As a result of adopting such a structure, the movable range of the movable member 21, i.e., the measurable range, can be expanded, and further in any ranges within the movable range of the magnetic substance 23 from "a" to "c", almost uniform measuring force is available for measurement. It is to be noted that it is not necessary in practical measurement to completely uniform the measuring force and it is sufficient enough that the measuring force should fall within the allowable range.

Further, the optical measuring apparatus having the measuring probe 10 of the present invention is structured such that current is constantly applied to either one of the coil 32A and the coil 32B through the control by the micro computer 34. The reason is as follows. That is, since the measuring probe 10 is horizontally mounted, there is no cause for concern regarding the operation if current supply is stopped in the state that the contact portion 25 is pulled away from the surface 6a of the wafer 6 by current supply to the coil 32B. However, since the heat, which is used to be generated from the current flowing through the coils 32A, 32b during current application, is removed, the temperature of the measuring probe 10 is reduced and each member is contracted. If the next measurement proceeds in this state, and current is applied to the coil 32A, then the heat generated thereby expands each member of the measuring probe 10. Particularly, if a temperature of the movable member 21 in the vicinity of the coil 32A is increased, the length of the movable member 21 is extended during the measurement, and an extended portion makes error of the measurement. In the present embodiment, however, almost constant heat is generated by constantly applying current to either one of the coils as described above, which eliminates error of measurement attributed to expansion and contraction during the measurement, thereby allowing high-accuracy measuring results to be gained. It is to be noted that the heat generated by the coil 32A and the coil 32B is almost equal as it acts upon the magnetic substance 23.

Further, in the optical measuring apparatus of the present embodiment, when the contact portion 25 is in contact with the measuring target face 6a for measurement through the control by the micro computer 34, the change-over switch 31 is connected to the amplifier 36Aa as shown in FIG. 1 so that the current is supplied to the coil 32A. When the state that the current is applied to the coil 32B is switched to the state that the current is applied to the coil 32A as shown in FIG. 2 for bringing the contact portion 25 into contact with the surface 6a, the change-over switch 31 is switched to the amplifier 36Ab through the control by the micro computer 34 as shown in FIG. 2 and a current weaker than the current supplied from the amplifier 36Aa is applied to the coil 32A.

The reason there of is as follows. The measuring force of the contact portion 25 during measurement needs to be strong enough to bring the contact portion 25 into contact with the surface 6a even if there are sharp projections and depressions on the surface 6a of the wafer 6 as the measuring target object. For increasing the travel speed of the contact portion 25 to shorten the measuring time, the measuring force needs to be increased proportionally. In the meanwhile, if acceleration for bringing the contact portion 25 into contact with the surface 6a is large, the vibration generated in the movable member 21 due to impacts when the contact portion 25 comes into contact with the surface 6a or the vibration generated in the movable member 21 because of a magnetic line of force produced by the coil 32A being not necessarily aligned with the axis line direction of the movable member 21 is increased though within the range of the space 29 of the air bearing 22, by which the reflecting plane 27 is inclined and the optical axes of the measuring light beam L1 and the reflecting light beam become out of alignment, causing instantaneous elimination or reduction in the intensity of interference with the reference light beam L0, resulting in reset of a measured value. Once the measured value is reset, a value different from a value stored in a later-described memory portion 16 regarding a position A of the reflecting plane 27 when current is applied to the coil 32B is outputted, which disables the measurement to be continued. Further, if the acceleration is large, the surface 6a of the wafer 6 may be damaged. Generally, therefore, the acceleration for bringing the contact portion 25 into contact with the surface 6a should preferably be small. In the present embodiment, the current supply unit 37 for supplying current to the coil 32A is equipped with the change-over switch 31 for switching current values so that the current value from the point that the contact portion 25 is away from the measuring target face 6a to the point that the contact portion 25 comes again into contact with the measuring target face 6a is set lower than the current value during execution of the measurement. This allows measurement to be executed with the setting in an optimum state depending on the situation, thereby preventing the measured value to be reset or the measuring target face 6a to be damaged.

Figure 10:
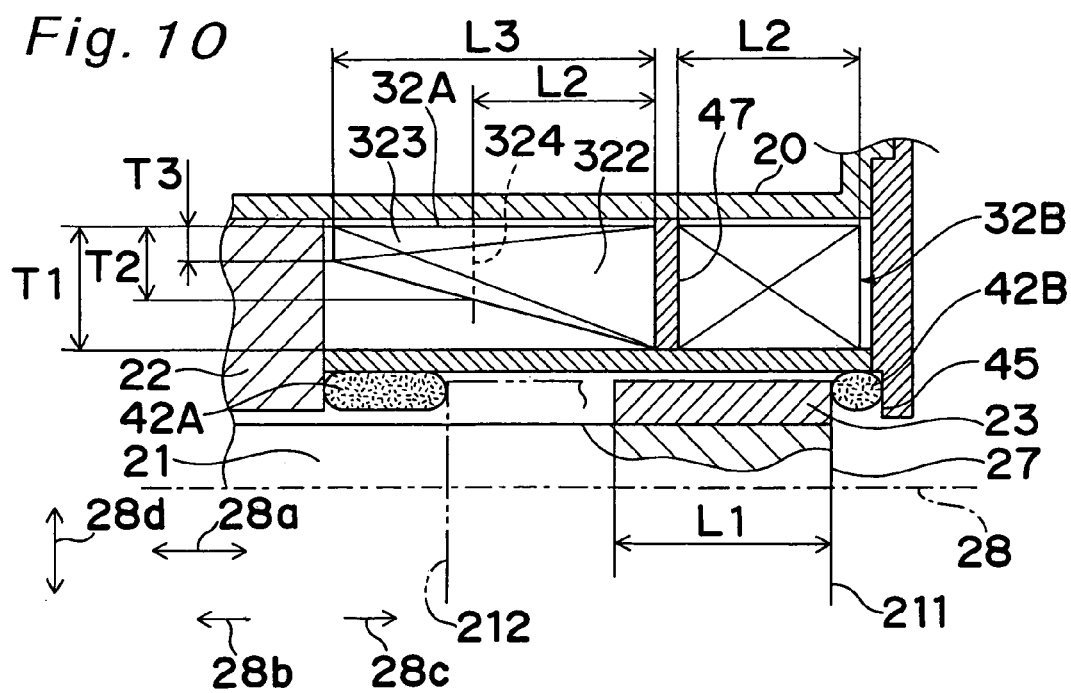
FIG. 10 is a view explaining the shape of one example of the measurement magnetic force generating portion included in the measuring probe of FIG. 1 to FIG. 3.
Figure 11:
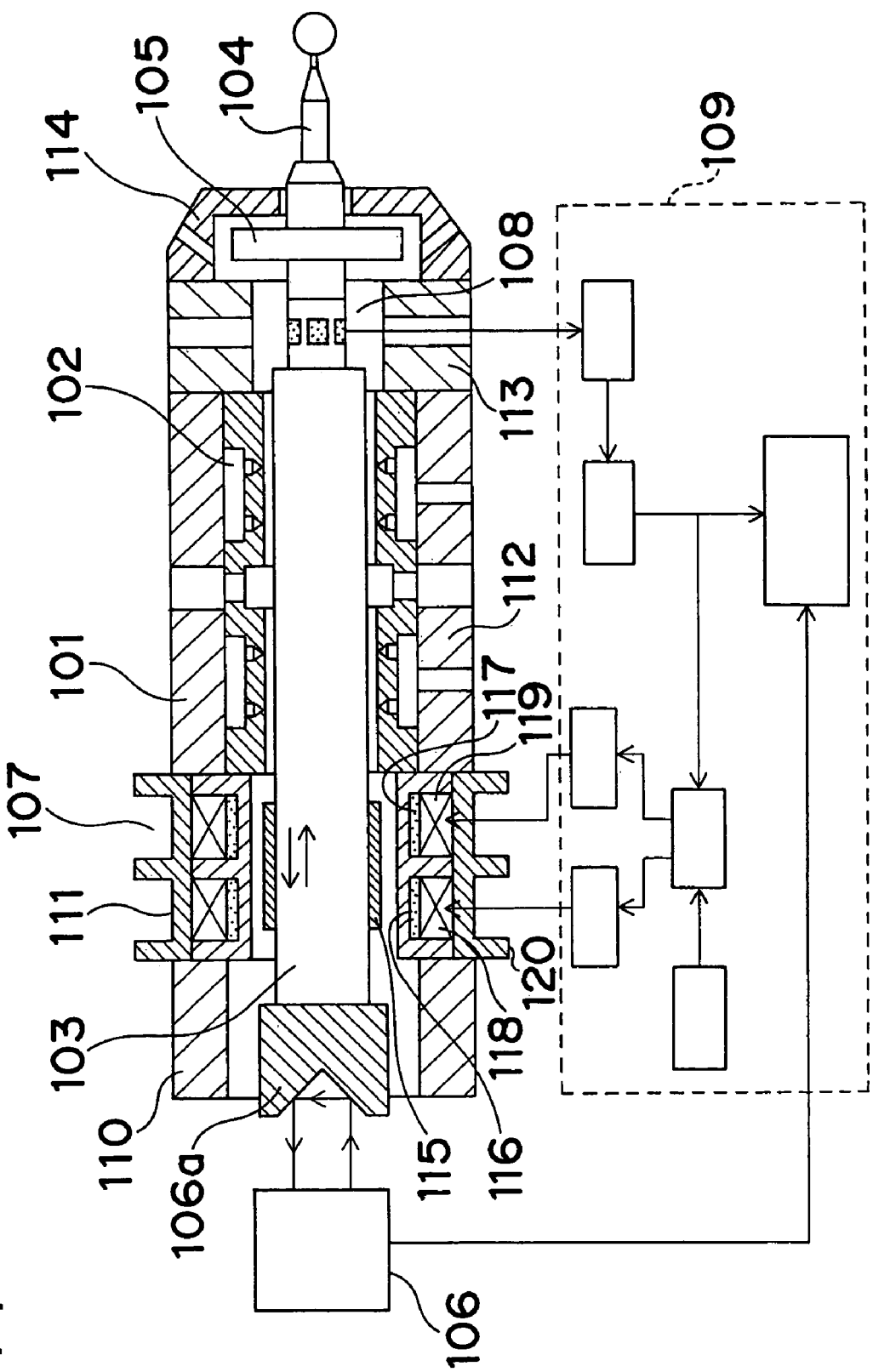
FIG. 11 is a cross sectional view showing a conventional measuring probe.

Further, the optical measuring apparatus of the present invention has the memory portion 16 as shown in FIG. 5 for storing a position of the reflecting plane 27 when current is applied to the coil 32A and a position A of the reflecting plane 27 when the movable member 21 is positioned at the retreat position 211 shown in FIG. 10 and when current is applied to the coil 32B as shown in FIG. 2. Then, the micro computer 34 is structured such that upon confirmation that the reflecting plane 27 is positioned at the position A, the micro computer 34 performs control over the aforementioned first current and the second current so as to shift the procedure to measurement of the measuring target face 6a. Eventually, in measurement of the flatness of the wafer 6 and the like, the position of the reflecting plane 27 is measured at the retreat position where the wafer 6 is not present, and upon confirmation that the reflecting plane 27 is positioned at the position A, the contact portion 25 serving as a measuring probe can be moved in the measuring direction 28b to start the measurement. This allows smooth progress of the measurement and prevents the side face of the contact portion 25 being hit by the wafer 6 to cause damages.

Generally, the first priority for the optical measuring apparatus before executing measurement is to detect the position of the contact portion. The method therefor includes a) a method for mounting a sensor such as cameras and b) a method for estimating the position of the contact portion by applying current to the coils 32A and 32B. The method a) has a drawback that mounting it on an extremely narrow place is difficult. The method b) has a drawback that though the position of the contact portion can be estimated, it is unclear whether or not current is applied and the contact portion is actually moving. In the present embodiment, however, the function of the measuring apparatus is used in its entirety to confirm the position of the contact portion 25 from the position of the reflecting plane 27, thereby allowing shift to the next step with security.

Figure 7:
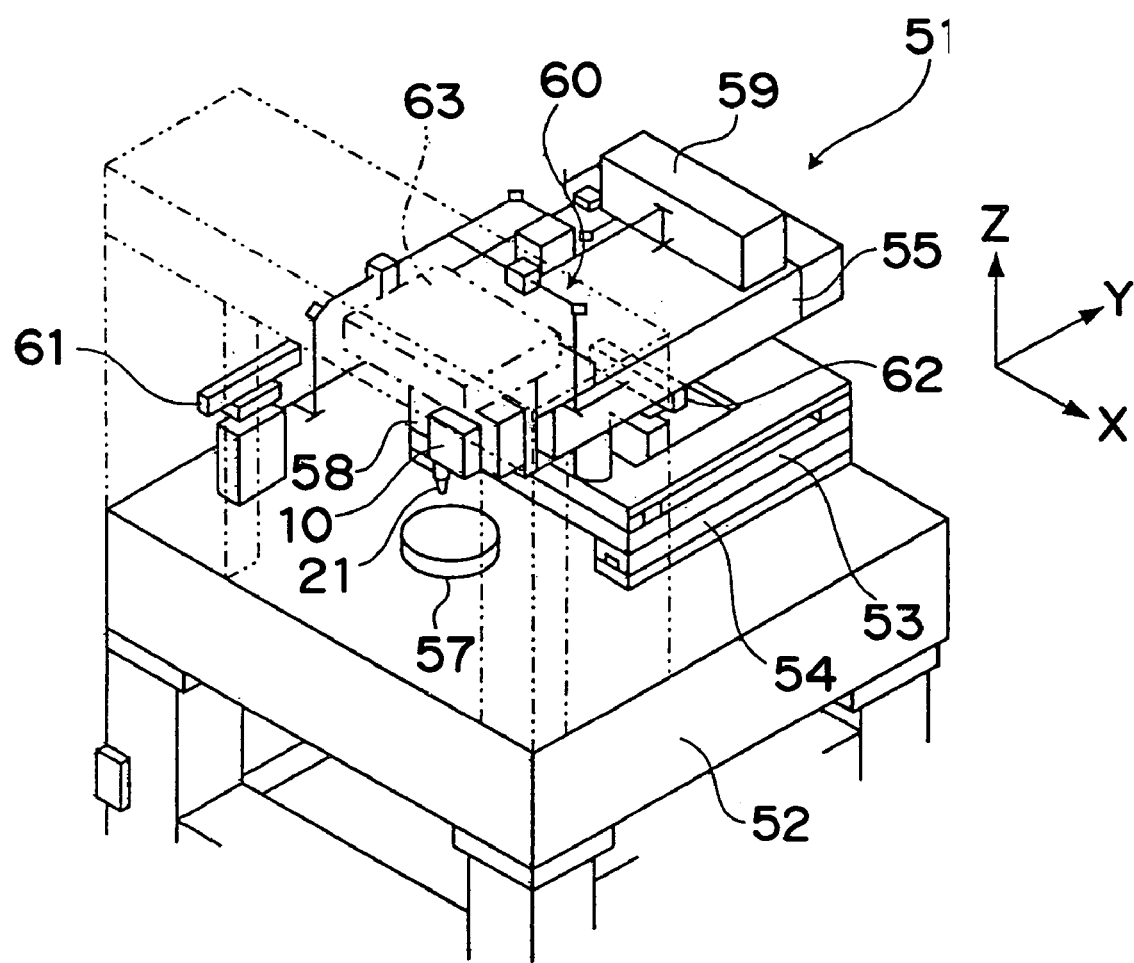
FIG. 7 is a perspective view showing a three-dimensional shape measuring apparatus having the measuring probe of FIG. 1 to FIG. 3.

FIG. 7 shows a three-dimensional shape measuring apparatus 51 having the measuring probe 10 according to the present embodiment. The three-dimensional shape measuring apparatus 51 has a holder 55 disposed on a lower base 52 through an X-table 53 and a Y-table 54. A lens 57 that is a measuring target object is disposed on the lower base 52. A z-axis moving portion 58 is mounted on the holder 55, and the measuring probe 10 according to the present embodiment is mounted on the z-axis moving portion 58. Herein the measuring probe 10 is disposed in vertical direction, and the posture of the movable member 21 is face-down in the vertical direction. A laser light beam generated in a light generating portion 59 is radiated as a reference light beam to an X-reference mirror 61 and a Y-reference mirror 62 on the lower base 52 as well as to a Z-reference mirror 63 fixed onto the holder 55 by an optical system 60 constituted from lenses and the like. Moreover, the laser light beam is radiated as a measuring light beam to the reflecting plane 27 of the measuring probe 10. By adopting the measuring method disclosed in the Japanese unexamined patent publication No. H06-265340, the measuring force may be kept constant.

Thus, the measuring probe 10 in the present embodiment is applicable to the three-dimensional shape measuring apparatus.

It is to be noted that, by properly combining the arbitrary embodiments of the aforementioned various embodiments, the effects possessed by them can be produced.

The entire disclosure of Japanese Patent Application No. 2003-426025 filed on Dec. 24, 2003, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A measuring probe, comprising:
    a housing configured to be made of a magnetic material in a cylindrical shape;
    a movable member configured to be provided inside the housing along an axis line of the housing, the movable member having a contact portion at one end configured to come into contact with a measuring target face and a reflecting plane formed at the other end configured to reflect a measuring light beam, and being made of a nonmagnetic material in a rod shape;

a magnetic substance configured to be mounted on the movable member;

a bearing made of a magnetic material which is in a cylinder shape with the movable member running through at a center portion, the bearing configured to be press-fitted into the housing and support the movable member movably in axis line direction in a non-contact state;

a magnetic force generating portion configured to be in a cylinder shape with the movable member running through at a center portion and be fitted into the housing, the magnetic force generating portion having a retreat magnetic force generating portion configured to work on the magnetic substance of the movable member and move the movable member toward retreat direction along the axis line direction, and a measurement magnetic force generating portion configured to work on the magnetic substance of the movable member and move the movable member toward measuring direction along the axis line direction; and a cover member configured to be mountable on and demountable from the housing, prevent the magnetic force generating portion and the movable member from dropping off from the housing, and be made of a magnetic material.

2. The measuring probe as defined in claim 1, further comprising a spacer configured to be provided so as to come into contact with the magnetic substance in both end portions of the magnetic force generating portion in the axis line direction, determine a moving amount of the movable member in the axis line direction, and be made of a nonmagnetic material.

3. The measuring probe as defined in claim 1, wherein the measurement magnetic force generating portion is formed from a coil whose winding number is decreased toward the measuring direction so that magnetic field strength is gradually lowered toward the one end side of the movable member and force acting upon the magnetic substance is almost uniformed regardless of a moving amount of the movable member toward the measuring direction.

4. The measuring probe as defined in claim 3, wherein a length of the measurement magnetic force generating portion along the axis line direction is equal to or larger than a length of the retreat magnetic force generating portion.

5. The measuring probe as defined in claim 4, wherein the magnetic substance has such a length that part of the magnetic substance overlaps with part of the measurement magnetic force generating portion when the movable member is positioned at a retreat position.

6. The measuring probe as defined in claim 1, wherein the measurement magnetic force generating portion has a first generating portion which is a portion coming close to the retreat magnetic force generating portion and has a length along the axis line direction equal to a length of the retreat magnetic force generating portion, and a second generating portion which is adjacent to the first generating portion and extends in the measuring direction beyond the first generating portion and is formed integrally with the first generating portion for moving the magnetic substance toward the measuring direction over the first generating portion.

7. The measuring probe as defined in claim 6, wherein a thickness of the measurement magnetic force generating portion in orthogonal direction orthogonal to the axis line direction on a boundary between the first generating portion and the second generating portion is ⅔ of a thickness of a thickest portion of the measurement magnetic force generating portion.

8. The measuring probe as defined in claim 7, wherein a thickness of a thinnest portion of the measurement magnetic force generating portion is ½ of the thickness of the thickest portion.

9. The measuring probe as defined in claim 1, further comprising a current supply unit configured to supply current to the measurement magnetic force generating portion and the retreat magnetic force generating portion, the current supply unit having: a first supply portion configured to supply a first current to the measurement magnetic force generating portion during measurement of the measuring target face while the contact portion is in contact with the measuring target face; a second supply portion configured to supply a second current weaker than the first current to the measurement magnetic force generating portion when the contact portion is brought into contact with the measuring target face; and a change-over switch configured to connect the measurement magnetic force generating portion to either one of the first supply portion and the second supply portion.

10. A method for using a measuring probe which supports a movable member movably in axis line direction of the movable member, the movable member having a contact portion which comes into contact with a measuring target face at one end and having a reflecting plane formed at the other end for reflecting a measuring light beam, the method comprising:

bringing the contact portion of the movable member into contact with the measuring target face with a second current configured to bring the contact portion into contact with the measuring target face; and after bringing the contact portion into contact, starting measurement of the measuring target face in a state the contact portion is pressed to the measuring target face with a first current configured to be stronger than the second current and press the contact portion to the measuring target face with force allowing movement in conformity to the measuring target face.

11. The method for using a measuring probe as defined in claim 10, further comprising:

storing in advance a retreat position at which the movable member is positioned with the contact portion being away from the measuring target face, and after it is confirmed based on the stored memory that the movable member is positioned at the retreat position, bringing the contact portion into contact with the measuring target face with the second current.

* * * * *